May 2, 1950 E. A. ERICSSON 2,506,200

DEVICE FOR SELECTION OF GROUPS OF LINES
WITHIN AUTOMATIC TELEPHONE EXCHANGES

Filed April 12, 1946 3 Sheets-Sheet 1

Inventor
E. A. Ericsson
By Glascock Downing & Seebold
Attys.

May 2, 1950 E. A. ERICSSON 2,506,200

DEVICE FOR SELECTION OF GROUPS OF LINES WITHIN AUTOMATIC TELEPHONE EXCHANGES

Filed April 12, 1946 3 Sheets-Sheet 2

Inventor
E. A. Ericsson
By Glascock Downing & Seebold
Attys.

May 2, 1950 E. A. ERICSSON 2,506,200

DEVICE FOR SELECTION OF GROUPS OF LINES
WITHIN AUTOMATIC TELEPHONE EXCHANGES

Filed April 12, 1946 3 Sheets-Sheet 3

Inventor
E. A. Ericsson
By Glascock Downing & Seebold
Attys.

Patented May 2, 1950

2,506,200

UNITED STATES PATENT OFFICE 2,506,200

DEVICE FOR SELECTION OF GROUPS OF LINES WITHIN AUTOMATIC TELEPHONE EXCHANGES

Eric Arvid Ericsson, Stockholm, Sweden, assignor to Telefonaktiebolaget L M Ericsson, Stockholm, Sweden, a company of Sweden Application April 12, 1946, Serial No. 661,576
In Sweden December 13, 1943

1 Claim. (Cl. 179—18)

The present invention relates to automatic telephone plants at which selectors are set wholly or partly under control of a registering device. It is an object of the invention to arrange and from a registering device to control the setting of the selectors of a telephone plant so that the number of groups of lines and outgoing traffic directions from the different selector steps are increased beyond the number of the groups of lines corresponding to the positions of the selectors in their first setting movement. Thus larger groups of subscriber's lines may be obtained besides which the number of selector steps is reduced which entails considerable savings of expense. According to the invention this is achieved thereby that at automatic telephone plants, within which speaking connections are arranged by aid of selecting devices having each two setting movements, of which the first is used for selection of a group of lines among a number of groups of lines, all or certain of said groups of lines in their turns are divided into subgroups and a registering device combined with a link circuit, over which a speaking connection is to be set, records at least a characteristic for the first series of impulses for this connection coming in to said link circuit, whereupon said registering device by signals controls each or certain selectors in the following speaking connection to select one of the subgroups available in the second setting movement of the selector in dependence upon said characteristic.

The invention will be more closely described with reference to the accompanying drawings, Figs. 1–3.

Figure 1:
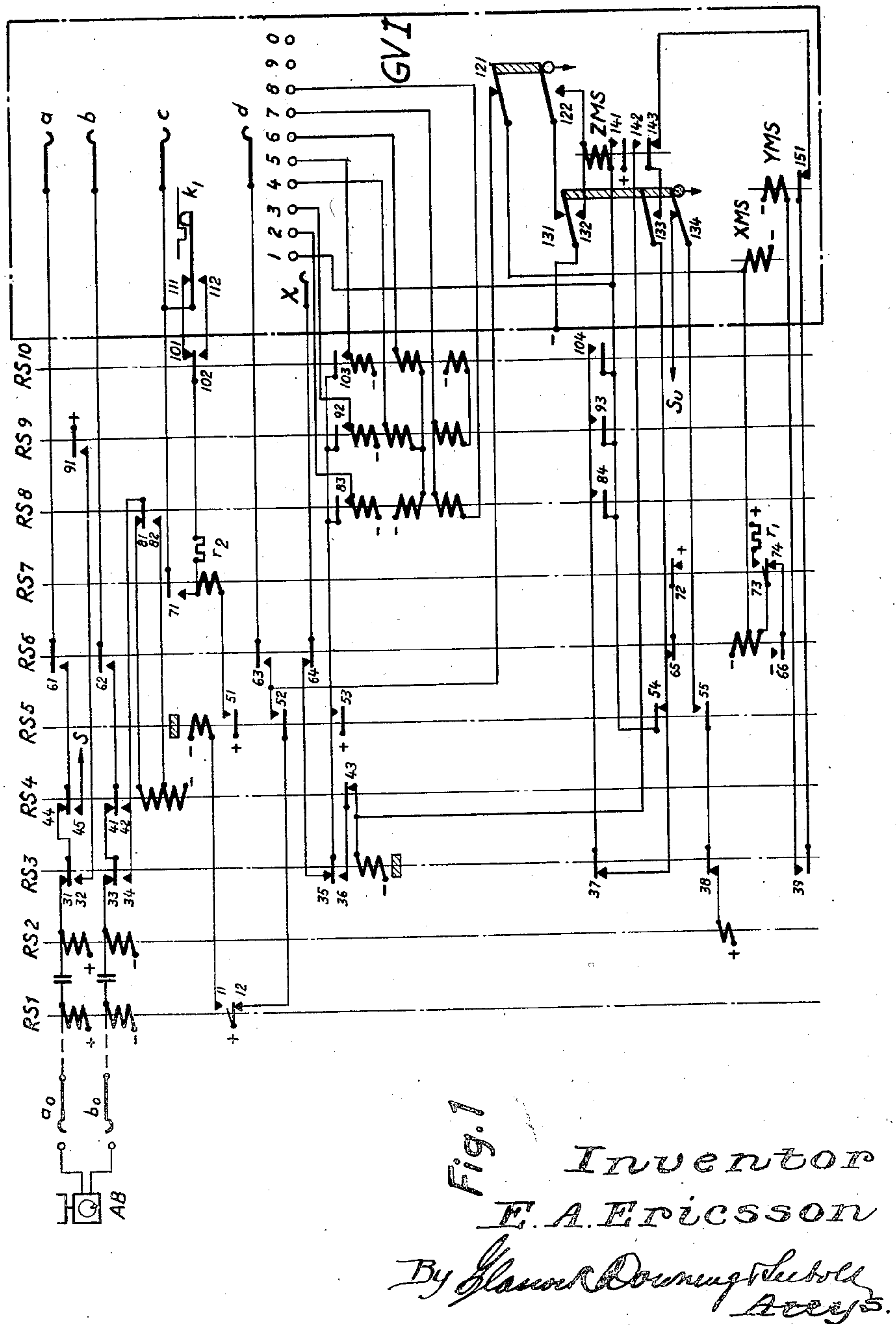
Fig. 1 shows a cord line with appertaining group selectors CV1 and a registering device consisting of the relays RS8—10.

All selectors are step-by-step driven and have 10 positions in the first setting movement and 20 positions in the second setting movement. For each position in the first setting movement is a multiple frame with 20 lines. The 20 lines in a multiple frame for group selectors are divided in two groups of 10 lines representing two different traffic directions. The 10 first lines in a multiple frame for final selectors belong to one group of 100 subscribers' numbers and the 10 other lines in the same frame belong to another group of 100 subscribers' numbers. The said two groups of 100 subscribers' numbers belong to different thousands of subscribers' numbers, as will be described below.

The system here described is an automatic telephone system for 80,000 subscribers. The first digit 1–8 in the called subscriber's number sets the group selector GVI in Fig. 1 and is recorded on the relays RS8—RS10 whereupon the group selector GVI is restored to normal. The second digit sets the group selector GVI in its first setting movement. If the first digit is 1–4, the group selector GVI selects a line among the first 10 lines, available by its second setting movement. If the first digit is 5–8, the group selector selects a line among the later 10 lines available by its second setting movement. Thus 20 outgoing traffic directions are obtained from the group selector GVI.

Figure 2:
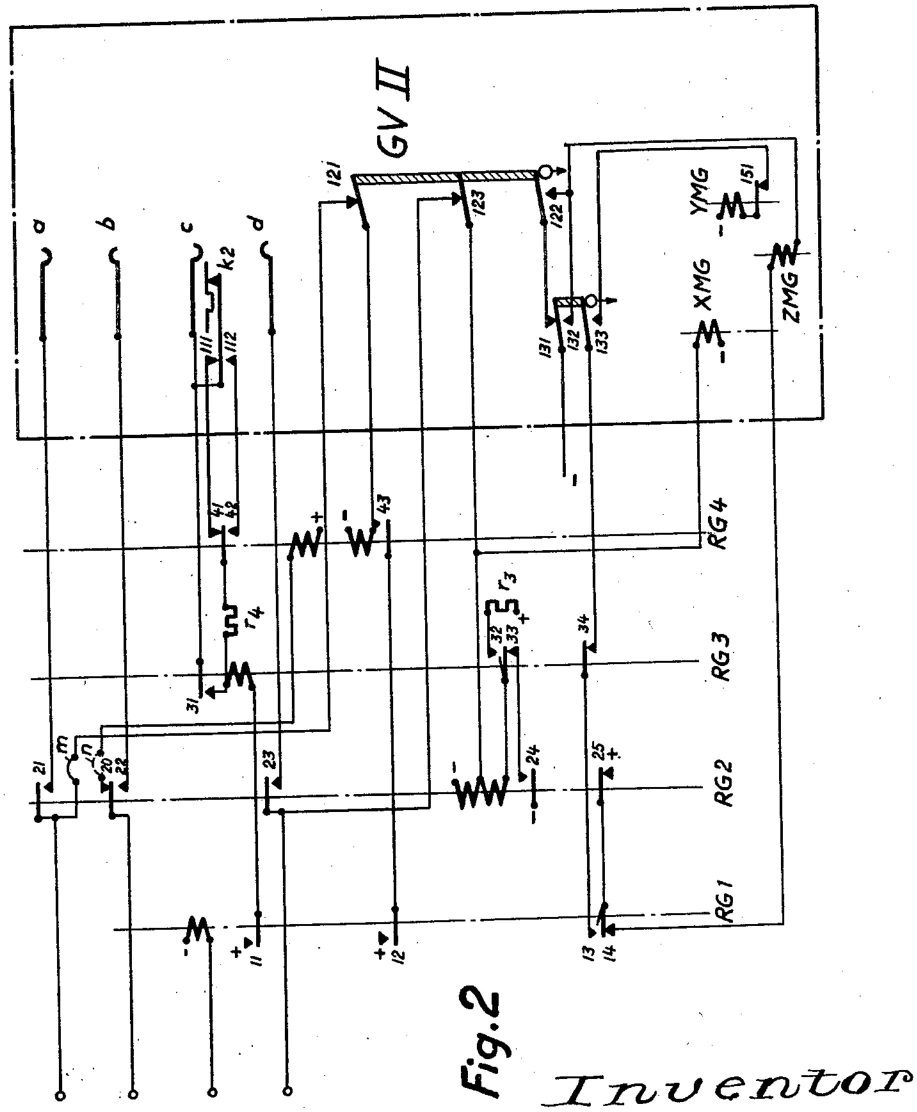
Fig. 2 shows a second and a third group selector respectively with appertaining control relays.

The third digit sets a second group selector GVII Fig. 2 in its first setting movement. If the first digit in the called subscriber's number is 1, 2, 5 or 6, the group selector GVII selects a line among the first 10 lines in the multiple frame to which it is set. If the first digit is 3, 4, 7 or 8, the group selector GVII selects a line among the later 10 lines in said multiple frame.

Figure 3:
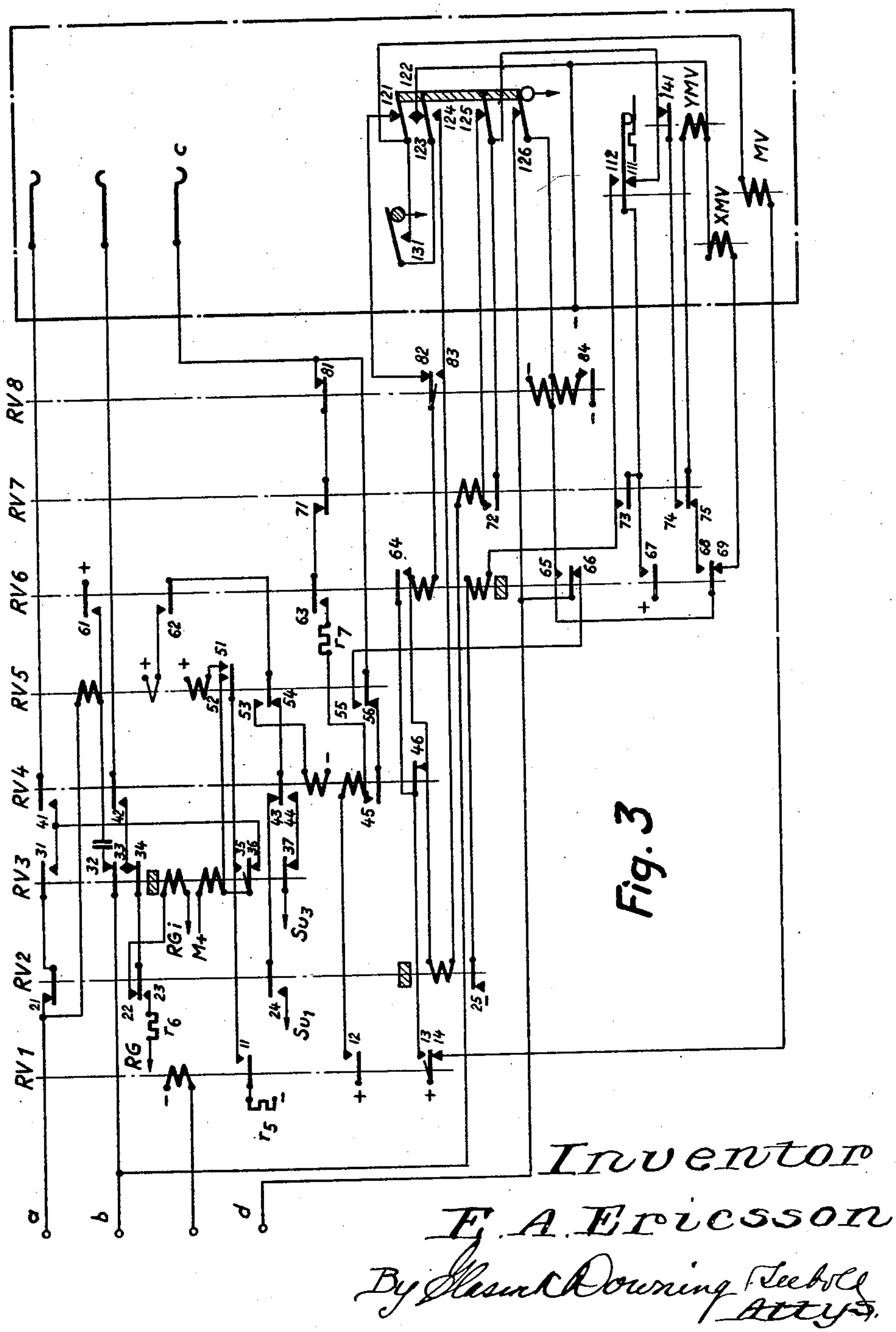
Fig. 3 shows a final selector with its control relays.

The 4th digit sets a final selector, LV Fig. 3, in its first setting movement. If the first digit in the called number is 1, 3, 5 or 7, the final selector is only set in its second setting movement by the last digit in the telephone number. If, however, the first digit is 2, 4, 6 or 8, the final selector takes 10 steps in its second setting movement in the pause between the 4th and 5th digit, whereupon the 5th digit steps the final selector to a line among the last 10 lines in a multiple frame for final selectors.

The subscriber AB in Fig. 1 calls the telephone exchange and is in some known manner connected over a line finder, the wipers of which $a_0$, $b_0$ are indicated in the figure. The positive pole of the exchange battery, in the sequel called positive, is in the figures indicated with + and its negative pole, in the sequel called negative, with —. The feeding relay RS1 attracts its armature when the line finder has been set on the line corresponding to AB. The contacts 11 and 12 are actuated, relay RS5 receives current and attracts its armature. Contacts 51—55 are actuated. Thus a buzzer tone is connected to the subscriber's line through the following circuit: positive, winding on relay RS2, contacts 38, 55 and 134, to the buzzer signal generator $Su$. The buzzer tone is induced over to the feeding windings on relay RS2, passes two condensers connected between the relays RS1 and RS2 and reaches the wipers $a_0$, $b_0$ and the subscriber AB. The subscriber may now begin the impulse sending from his dial. At the first break of the circuit over the subscriber's line the relay RS1 releases its armature. The contact 11 opens but the relay RS5 remains actuated since it is slow-releasing. The contact 12 is closed and the following circuit is formed: positive, contacts 12, 52 and 121, winding on magnet XMS, to negative. Parallel with the winding on the magnet XMS there is a winding on the relay RS6. The magnet XMS and relay RS6 attract their armatures. The group selector GV1 moves one step, the contacts 131 and 134 are broken and 132—133 closed, the wiper X is moved to contact 1. Simultaneously the contacts 61—66 are actuated. At the end of the first dial impulse the relay RS1 again attracts its armature. The contact 12 is broken, the magnet XMS releases its armature. The relay RS6 however, holds its armature a short while since the relay is slow-releasing through the following circuit: negative, both the windings on RS6 in series, contacts 74 and 66, to negative. At the next impulse from the dial, RS1 again releases its armature, XMS and RS6 are again magnetized, wiper X is moved to contact 2, GV1 is again moved one step and so on. When the impulse series from the subscriber's dial ceases, the relay RS6 releases its armature and a circuit is completed from positive over the contacts 53, 35 and 64, the wiper X and the contact to which the selector GV1 is set, a combination of the windings on relays RS8—10, to negative. That or those of the relays RS8, RS9 or RS10 which are magnetized in said circuit, attract their armatures and are self held over their contacts 83, 92 and 103 respectively. Then the following circuit is completed: positive, contacts 72, 65 and 37, one of the contacts 84, 93 or 104, winding on the reset magnet ZMS, contact 132 to negative. If the group selector is set to position 1, none of the relays RS8—10 attracts its armature, the following circuit being instead completed when relay RS6 releases its armature: positive, contacts 53, 35 and 64, wiper X, contact 1, winding on magnet ZMS, contact 132, to negative. The magnet ZMS attracts its armature, contacts 141—143 are actuated and the selector mechanism is restored to the initial position. During the reset process the magnet ZMS is self-held with current over contact 141. Over the contact 142 the following circuit is completed: positive, contact 72, 65, 133 and 142, winding on relay RS3 to negative. The relay RS3 attracts its armature and the contacts 31—39 are actuated. Simultaneously the start circuit for the searching movement of the group selector is broken by the contact 143. When the group selector returns to its initial position the contact 132 opens and the magnet ZMS releases its armature. Relay RS3 is self-held with current over the contacts 53, 36 and 43.

At the next impulse series from the dial of the subscriber the operation above is repeated but the circuits over the contact 35 and the contact 37 are now broken and therefore no alteration in the position of the relays RS8—10 takes place and the reset magnet ZMS is not actuated. Instead is, after the second impulse series, the contact 39 closed and the driving magnet YMS receives current in the following circuit when relay RS6 releases its armature after the second impulse series: positive, contacts 72, 65, 133, 143, 151 and 39, winding on magnet YMS to negative. The magnet YMS attracts its armature and moves the wipers *a*, *b*, *c*, *d*, one step into the multiple to the first line in that group of lines before which the group selector is set by the second digit. The self-breaking contact 151 is broken and the magnet YMS releases its armature, and so on. The wipers *a*, *b*, *c*, *d* are progressed over the multiple contacts in said group of lines. Two cases may now be distinguished.

(1) If the first digit in the subscriber's number was 5, 6, 7 or 8 the relay RS10 has attracted its armature and is self-held over the contact 103. The contacts 101 and 102 have been actuated. The test circuit of the group selector is now broken until the contact device $K_1$ is actuated, the contact 111 and the contact 112 being closed. The contact device $K_1$ is actuated when the group selector has passed for instance half the number of the lines in the group of lines determined by the second digit of the subscriber's number. Thus the following test circuit is completed: positive, contact 51, winding on relay RS7, resistance $r2$, contacts 102 and 112, the *c*-wiper of the group selector to negative over the winding on relay RG1 in Fig. 2 in some free group selector GVII. On finding a free group selector the relay RS7 attracts its armature. The contacts 71—74 are actuated. The contact 71 disconects the resistance $r_2$, the contact 72 breaks the circuit of the driving magnet YMS so that the searching movement ceases, the contact 73 closes a circuit for the relay RS6 in series with the protection resistance $r_1$ and the contact 74 prevents that a circuit is formed over the contact 66. The relay RS6 attracts its armature and the contacts 61—66 are actuated.

(2) If the first digit in the subscriber's number was 1, 2, 3 or 4 the relay RS10 has not attracted its armature and thus the test circuit of the *c*-wiper of the group selector is closed over the contacts 101 and 111 during the first part of the searching movement of the group selector. If no free line is found the contact device $k_1$ is actuated and the contact 111 broken. The test circuit is thus broken during the later part of the searching movement.

The multiple of the group selector GVI is thus divided into two halves, the one in front corresponding to the digits 1–4 as first digit and the back one corresponding to the digits 5–8 as first digit. The digits 1–4 and 5–8, respectively, differ however by the relays RS8 and RS9 being actuated in different combinations, which are signalled to the following group selector steps on the speaking lines *a* and *b*. Neither the relay RS8 nor the relay RS9 has attracted its armature if the first digit is 1 or 5 and no special signal is sent on the *a*- or the *b*-line. The following group selector GVII according to Fig. 2 is set by the third digit in the subscriber's number. The impulses from the subscriber's dial is repeated by the relay RS1 in Fig. 1 to the following circuit: positive, contacts 12, 52 and 63, the *d*-wiper of GVI, contact 123 in Fig. 2, winding on magnet XMG to negative. Parallel with the magnet XMG the relay RG2 receives current through its one winding and attracts its armature. The contacts 21—25 are actuated. The magnet XMG steps out the group selector GVII to the position corresponding to the third digit in the subscriber's number. The relay RG2 is slow-releasing since the contact 24 keeps the windings of the relay short-circuited during the breaks between the impulses, the relay thus holding its armature during the whole impulse series corresponding to the third digit in the subscriber's number. After the end of the impulse series the relay RG2 releases its armature. The relay RG1 has already earlier attracted its armature, namely when the group selector GVI stopped on the multiple corresponding to the group selector GVII. The contacts 11—14 were then actuated and thus the following circuit is completed when relay RG2 releases its armature: positive, contacts 25, 13, 34, 133 and 151, winding on the driving magnet YMG to negative. The group selector GVII starts in a free choice and is searching over the lines in the traffic direction indicated by the third digit in the subscriber's number. Since no signal has reached the speaking lines *a* and *b* the relay RG4 has not attracted its armature and thus the following test circuit is formed: positive, contact 11, winding on relay RG3, resistance $r_4$, contacts 41 and 11, the *c*-wiper of the group selector GVII to negative over the winding on relay RG1 in some free selector in the next selector step. The group selector GVII will test only over those lines in the group of lines indicated by the third digit of the subscriber's number, which lie foremost in the group of lines. Thus when a number of lines, for instance corresponding to half the free choice-capacity, has been passed, the contact device $k_2$ is actuated and the test circuit is broken in the contact 111 for the remaining part of the searching movement.

As is shown in Fig. 2 the group selector GVII may be connected in two different ways: either is the connection *n* or the connection *m* inserted. Which of the two connections that is to be inserted is determined by the selector step to which the group selector belongs. Here is supposed that the group selector belongs to the second selector step, i. e. receives the third digit in the subscriber's number and that the connection *m* is inserted. If the first digit is 3, 4, 7 or 8 the relay RS9 in Fig. 1 has attracted its armature and the contact 91 is closed. As soon as the selector GVI is connected with the group selector GVII the following circuit is completed: positive, contacts 91, 32, 44 and 61, the *a*-wiper of the group selector, connections *m* in Fig. 2, contact 121, winding on relay RG4 to negative. The relay RG4 attracts its armature and the contacts 41—43 are actuated. The relay RG4 is self-held with current over the contact 43. When the group selector GVII is set by the impulse series corresponding to the third digit in the subscriber's number the contacts 121—123 are actuated and the circuit which runs over the connection *m* is broken in the contact 121 and separated from the *a*-line. At the following searching movement the test circuit of the relay RG3 will not be closed until the contact $k_2$ is actuated and thus the following circuit is formed positive, contact 11, winding on relay RG3, resistance $r4$, contacts 42 and 112, the *c*-wiper of the selector to negative through the winding on relay RG1 in some free selector in the next selector step. The relay RG3 attracts its armature and the contacts 31—34 are actuated. The contact 31 disconnects the series resistance $r4$. The contact 34 breaks the circuit for the driving magnet YMG. The contact 32 closes a circuit for the relay RG2 over the resistance $r3$ and the contact 33 prevents that a circuit is arising over the contact 24. The relay RG2 attracts its armature and the contacts 21—25 are actuated. The speaking lines *a* and *b* are closed by the contacts 21 and 22 and the impulse line *d* is closed over the contact 23.

The group selectors in the third selector step are performed according to Fig. 2 but instead of the connection *m* the connection *n* is mounted. In the first group selector piece the digits 1–4 were separated from the digits 5–8 and in the second group selector step the digits 1–2 were separated from the digits 3–4 and the digits 5–6 from the digits 7–8. In the third group selector step the digits 1 and 2, 3 and 4, 5 and 6, 7 and 8, respectively shall be separated. This occurs by aid of the relay RS8 in Fig. 1. The relay RS8 attracts its armature and one of the digits 2, 4, 6 or 8 is dialled as the first digit in the subscriber's number. Thus the contacts 81—84 are actuated. When, according to the description above, the relay RS3 attracted its armature, the windings on the relay RS4 were connected over the contact 34 to the *b*-line. That winding, which is connected between the contacts 81 and 82, has a high resistance and the winding which lies connected between the contact 82 and negative has a rather low resistance. When a second group selector connects itself to a third group selector the following circuit is completed: negative, one or both windings on relay RS4, one of the contacts 81 or 82, contacts 34, 41 and 62, the *b*-wiper of the first group selector, contact 22 in Fig. 2, the *b*-wiper of the second group selector, contact 20 in the third group selector, connection *n*, winding on relay RG4, to positive. The relay RS4 in Fig. 1 attracts its armature independent of the circuit running over the contact 81 or the contact 82. The contacts 41—45 are actuated and relay RS4 is self-held over the contact 42. The circuit of the relay RS3 is broken in contact 43 and the relay RS3 releases its armature, the *a*-line being thus closed in contact 31 and the *b*-line in contact 33. As long as the circuit of the relay RS4 is closed the *a*- and *b*-lines are still broken in the contacts 44 and 41, respectively. If the relay RS8 in Fig. 1 has attracted its armature, the relay RG4 in Fig. 2 attracts its armature. If, on the contrary, the relay RS8 has not attracted its armature the relay RG4 in the third group selector can not attract its armature. The switching operation of the third group selector will thus be analogous to the switching operation of the second group selector according to the description above, only with the difference that the selector is set by the fourth digit in the subscriber's number instead of by the third. Furthermore the relay RG4 receives current over the connection *n* instead of over the connection *m*. When the switching operation of the third group selector begins, the relay RG2 attracts its armature and the contact 20 is broken. The relay RG4 remains magnetized since the self-held contact 43 is closed. The relay RS4 in Fig. 1, however, releases its armature and is disconnected from the *b*-line since contact 42 opens. The contact 41 closes the connection over the *b*-line.

The communication may now be extended over the third group selector to a final selector being set by means of two further digits in the subscriber's number.

The invention may of course be used in many different ways. Thus the third group selector in the description above may be substituted by a final selector for 200 lines and the signal of the *b*-line may actuate a relay controlling the final selector to the one or other hundred, for instance by having the final selector in the pause between the two last digits in the subscriber's number step 10 steps in the line group of 20-lines determined by the last digit but one or by having the final selector automatically step forward 10 steps after the end of the last digit when said signal on the *b*-line has been registered by a relay in the final selector corresponding to relay RG4 in Fig. 2.

Fig. 3 shows a final selector which under influence of a signal from the registering device in Fig. 1 in the pause between the two last digits in the subscriber's number is stepping forward 10 steps and which then by the impulse series corresponding to the last digit is set to a line within another group of lines than the one within which the selector would have been set if the above mentioned signal did not exist.

Here is supposed that the final selector according to Fig. 3 is selected by another group selector according to Fig. 2, in which the connection *m* is laid, but not the connection *n*. Thus relay RV1 attracts its armature and the contacts 11—14 are actuated. The impulse series corresponding to the last digit but one in the subscriber's number comes in over the line *d*, contacts 126 and 69, through winding on magnet XMV, to negative. Magnet XMV attracts its armature and moves the final selector one step. Contact 131 is actuated. Parallel with the winding on magnet XMV the relay RV8 receives current through its one winding, attracts its armature and becomes, due to contact 84 being closed, slow-releasing and thus the armature of the relay is closed during the whole incoming impulse series. Contacts 81—84 are actuated. After the end of the impulse series the relay RV8 releases its armature and the following circuit is formed: positive, contacts 13 and 46, winding on relay RV6, contacts 82, 121, 131 and 123 to negative. Relay RV6 attracts its armature. Contacts 61—69 are actuated. Thus the following circuit is completed: positive, contacts 67, 111 and 125, winding on relay RV7, *b*-line. If no signal exists on the *b*-line the relay RV7 is not actuated and the next impulse series comes into the following circuit: *d*-line, contacts 65, 68 and 75, winding on magnet YMV, to negative. The magnet YMV attracts its armature and moves the wiper set of the selector one step in the direction of motion corresponding to the magnet YMV. The contacts 121—126 are actuated. Parallel with the winding on magnet YMV relay RV8 again receives current, attracts its armature and holds it during the whole incoming impulse series. Contacts 81—84 are actuated. Relay RV6 is during the impulse series held through the following circuit: positive, contacts 13 and 64, winding on relay RV6, contacts 83, 124, 131 and 122 to negative.

If, on the contrary, there is a signal on the *b*-line the following circuit is completed when relay RV6 attracts its armature: negative, winding on relay RS4 in Fig. 1, contacts 82, 34, 41 and 62, the *b*-wiper of the group selector GVI, contact 22 in Fig. 2, the *b*-wiper of the group selector GVII, *b*-line in Fig. 3, winding on relay RV7, contacts 125, 111 and 67, to positive. Relay RV7 attracts its armature and contacts 71—75 are actuated. Relay RV6 is self-held through a circuit from positive over the contacts 67 and 73, winding on relay RV6, contact 25, to negative. The following circuit is formed simultaneously: positive, contacts 67, 111, 141 and 74, winding on magnet YMV, to negative. Magnet YMV attracts its armature, moves the wiper set of the final selector one step and actuates the self-breaking contact 141. The last-mentioned circuit is broken by the contact 141, magnet YMV releases its armature, contact 141 closes and so on. The magnet YMV moves the wiper set of the final selector until the contacts 111—112 are actuated by a stud accompanying the wiper set. Thus the self-operating current is broken by the contact 111. Contacts 121—126 were actuated when the self-operating movement began and thus the relay RV7 is self-held over contact 72. When contact 11 opens, the relay RV7 releases its armature, the self-held current of relay RV6, however, being still closed over contact 112. When the second impulse series comes in, the relay RV8 and its contacts 81—84 are actuated. Relay RV2 attracts in the following circuit: positive, contacts 13 and 64, winding on relay RV2, contacts 124, 131 and 122, to negative. Relay RV2 attracts its armature and the contacts 21—25 are actuated. The wiper set of the selector is stepped out, the self-held current of the relay RV6 is broken in contact 25 but the relay is held by current over the contact 83 until relay RV8 releases its armature after the end of the impulse series.

Relay RV6 is slow-releasing and thus the following test circuit is completed during a short moment of time when relay RV8 releases its armature: positive, contact 12, winding on relay RV4, resistance *r*7, contacts 63, 71 and 81, the *c*-wiper of the final selector, to negative over a device on the line to which the selector had been set. If the line is free, relay RV4 attracts its armature and the contacts 41—46 are actuated. The ringing current is connected to the line in the following circuit: M+, winding on relay RV3, contacts 36 and 41, the wipers of the selector and the line, contacts 42, 34 and 23, resistance *r*6 to the ringing generator RG. On relay RV6 releasing its armature the circuit of the relay RV2, which is slow-releasing is broken, since contact 64 opens. Relay RV2 releases its armature and the ringing signal is switched from a continuous ringing over the contact 23 to the intermittent ringing over the contact 22 and winding on relay RV3 to the impulse device RG*i*. Relay RV3 is provided with a cupper casing and thus it is not actuated by the alternating current. Simultaneously with the ringing signals buzzer signals are induced to the speaking lines *a* and *b* between windings on relay RV5 through the following circuits: positive, primary winding on relay RV5, contacts 62, 54, 44 and 37, to the buzzer generator Su3; *a*-line, secondary winding on relay RV5, a condenser, contact 32, to *b*-line. The buzzer signals are heard by the calling subscriber. When the called subscriber answers, the ringing circuit is closed for direct current in the subscriber's telephone and relay RV3 attracts its armature due to current from a direct current source connected in a known way between M+ and RG*i*. Contacts 31—37 are actuated and the talking connection is closed by the contacts 31 and 33. The ringing current and the buzzer signals are disconnected. Relay RV3 is self-held with current over the resistance $r_5$ and the contacts 11 and 35.

If the called line had been busy, the test relay RV4 would not have attracted its armature during the release time of the relay RV6. A busy signal would have been connected to the speaking lines through the following circuit: positive, primary winding on relay RV5, contacts 62, 54, 43 and 24, to the buzzer signal generator $Su_1$. The relay RV2 would have been actuated with current over contact 46 and no talking connection set up.

At trunk connections over the final selector according to Fig. 3 also a signal has to be transmitted to the final selector independent of the above-described signals for indicating different line groups, said final selector indicating that the connection is a trunk one. Here is supposed that negative on the *a*-line during a moment of the time for the setting of the final selector is indicating a trunk call. When relay RV7 in Fig. 3 attracts its armature, relay RS4 in Fig. 1 also attracts its armature. Thus the contacts 44 and 45 are actuated and the *a*-line is connected to a signal line S. If the link circuit according to Fig. 1 is a trunk link circuit, the line S is connected to a signal device connecting negative to the *a*-line. Thus a circuit over the *a*-line is closed through a winding on relay RV5, over contact 61 to positive. Relay RV5 attracts its armature and is self-held in series with the resistance *r*5 with current over the contacts 11 and 51. When relay RV6 releases its armature relay RV4 receives current through the following circuit independent of the fact if the called line was free or not: positive, winding on relay RV5, contacts 62 and 53, winding on relay RV4 to negative. Relay RV4 attracts its armature, if so has not happened before. The *c*-wiper of the final selector is switched by the contacts 55 or 56 so that a new trunk test circuit, which is not shown in the figures, is formed over the *d*-line and the contacts 66 and 55. At the same time relay RV3 receives current in series with the resistance *r*5 over the contacts 11 and 52 and attracts its armature so that the speaking lines *a* and *b* are switched to the trunk link circuit.

The description above relates to an automatic system with step-by-step driven selectors being set directly by the impulses from the dial of the subscriber. The invention may, however, also be applied to automatic systems with machine-driven selectors and to automatic systems with registers controlling all or certain selector steps. The first digit has not to be registered in a registering device belonging to a first group selector but may as well be registered in a registering device common to a plurality of first group selectors, said registering device being either connected to a number of group selectors in a stiff connection or connected to a call by aid of some searching device. Not only the first digit has to be registered but all the digits in the subscriber's number may be registered in a register, from which the signals to the selectors for division of the group of lines in dependence of the first digit may be sent out in correspondence with the description above, whereas the following digits are controlling the setting of the selectors through discriminating devices in the register.

In the description above and on the drawings the lines in those groups of lines which can be reached by the selecting devices, are arranged in a row so that the lines are passed in a certain order by the wipers of the selecting devices. This is of course not necessary for the invention but the selecting devices may as well be performed with for instance two sets of wipers, which each simultaneously is magnetizing a part of a group of lines whereas the separating signals are indicating which wiper set is to take part in the switching operation.

I claim:

In an automatic telephone system, a calling subscriber's telephone set, a connecting link including an impulse relay, means controlled by the initiation of a call from said subscriber's telephone set for connecting said telephone set to said impulse relay, a register connected with said link and arranged to be set in one of a number of possible positions in accordance with a first impulse series from said telephone set transmitted by said impulse relay, a plurality of automatic two-motion switches, means controlled by said switches for establishing a train of selection stages for connecting said telephone set with the telephone set of a called subscriber, means for setting a communication from said link over one of said switches in a first selection stage in said train in accordance with a second impulse series transmitted by said impulse relay, means controlled by said one switch for selecting a two-motion switch in a succeeding selection stage, means controlled by a third impulse series from said telephone set for setting said last named two-motion switch in its first motion, a set of contacts in the last-named two-motion switch arranged for operation by said switch when the latter has passed a predetermined number of lines in its second motion, a marking relay connected to said last named two-motion switch, means controlled by said register when set by said first impulse series in a certain one of its positions for closing a circuit to said marking relay, and means controlled jointly by said marking relay and said set of contacts for advancing said last named two-motion switch past said predetermined number of lines in its second motion.

ERIC ARVID ERICSSON.

REFERENCES CITED

The following references are of record in the file of this patent:

UNITED STATES PATENTS

| Number | Name | Date |
|---|---|---|
| 1,395,977 | Stearn | Nov. 1, 1921 |
| 1,854,106 | Carpenter | Apr. 12, 1932 |
| 1,877,883 | Kahn | Sept. 20, 1932 |
| 1,900,969 | Wright | Mar. 14, 1933 |
| 1,902,187 | Saunders | Mar. 14, 1933 |
| 1,941,254 | Flad | Dec. 26, 1933 |
| 2,315,010 | Ostline | Mar. 30, 1943 |
| 2,348,301 | Lomax | May 9, 1944 |